UNITED STATES PATENT OFFICE.

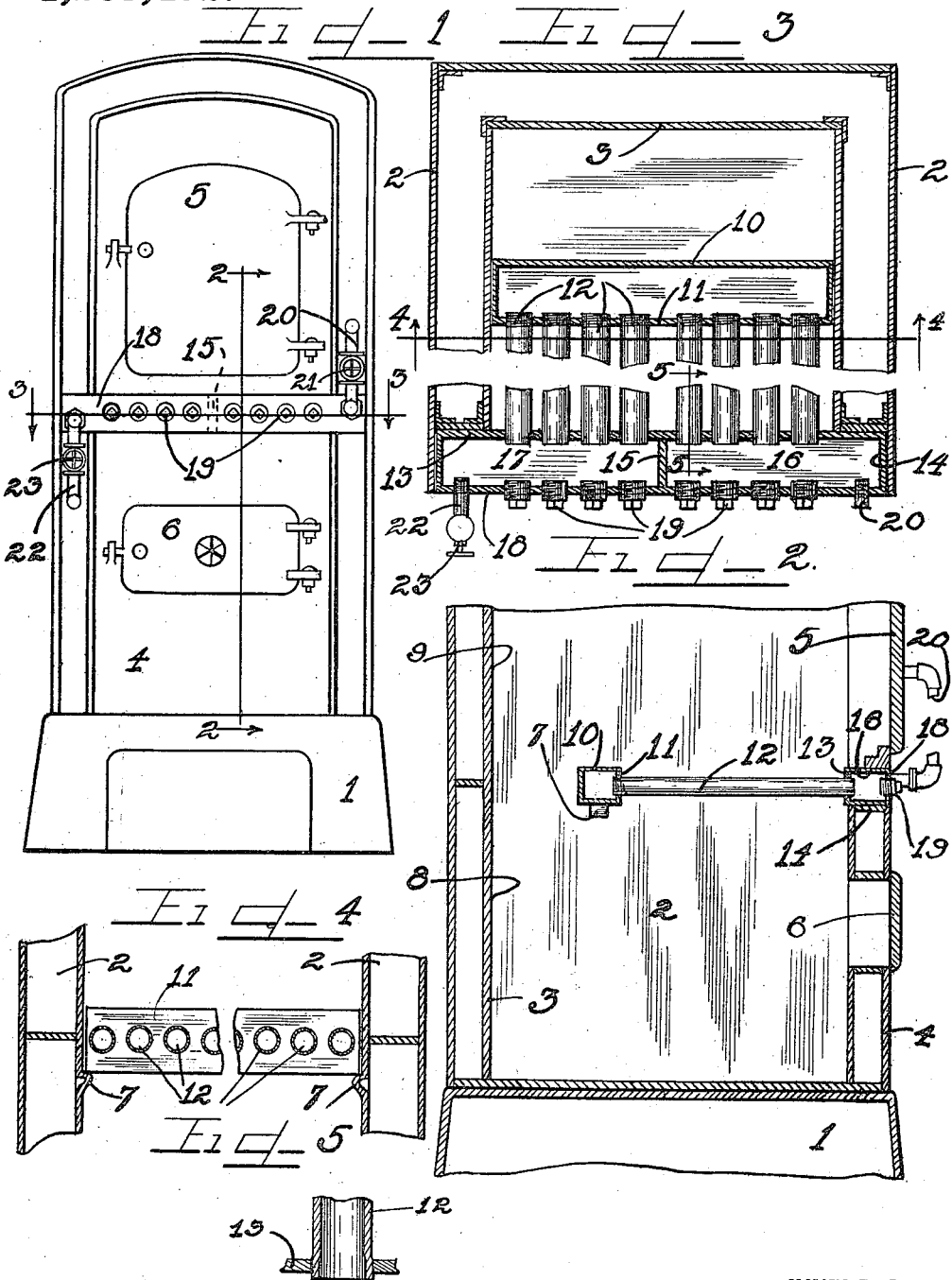

JAMES A. ROSS, OF CHICAGO, ILLINOIS.

GRATE FOR GARBAGE-BURNERS.

1,268,492.    Specification of Letters Patent.    Patented June 4, 1918.

Application filed March 17, 1917. Serial No. 155,414.

*To all whom it may concern:*

Be it known that I, JAMES A. ROSS, a citizen of the United States, and a resident of the city of Chicago, in the county of Cook and State of Illinois, have invented certain new and useful Improvements in Grates for Garbage-Burners; and I do hereby declare that the following is a full, clear, and exact description of the same, reference being had to the accompanying drawings, and to the numerals of reference marked thereon, which form a part of this specification.

In hot water heating and garbage burning plants of the type provided with pipe grates, particular difficulties are encountered due to the fact that the grates are not removable to permit cleaning, replacements or repairs of the grate parts, since the pipes forming the grates for the garbage burners are rigidly mounted with their ends swaged in the side walls of the water circulating system of the heating plant. The liquids and soft matter in the garbage placed within the garbage burner settles around the swaged grate pipe joints and soon corrodes the same causing leaks in the hot water system, which cannot be repaired without first putting the entire heating plant out of commission, often causing considerable delays and inconvenience.

This invention relates to an improved form of a water grate adapted for use in combination hot water heating plants and garbage burners, wherein the grate as a whole is readily removable from the heating plant to permit cleaning and repairs without necessitating shutting down of the heating plant, said grate having its parts so constructed that any one of the parts may be readily separated from the rest for cleaning, repairs or replacement.

It is an object of this invention to construct a removable water grate for garbage burners.

It is also an object of this invention to provide a removable water grate for garbage burners comprising removably connected parts any one of which is readily adapted to be removed for repairs or replacement.

It is a further object of this invention to construct a removable water grate for garbage burners comprising chambered end members connected together by a plurality of parallel pipes, said end members and pipes being arranged to permit the same to be readily removed from one another for repairs or replacement.

It is furthermore an object of this invention to construct a removable grate for a garbage burner of a water heater, the members comprising the same being removably attached to one another to permit replacement of any one thereof and reuse of the remaining members, said grate being provided with removable means permitting cleaning of the interior of the grate members without necessitating the removal of the grate from the garbage burner.

It is an important object of this invention to provide a water grate for garbage burner plants constructed of parts readily detachable from one another for repairs for replacement, said water grate adapted to be readily removed from the furnace without interfering with the hot water circulating system or the fire.

It is also an object of this invention to provide a tubular water grate for use in a garbage burning hot water heater, simple and effective of construction, adapted to be connected with the water circulating system of the plant and readily disconnected therefrom and removable from the furnace without interruption to the operation of either the water circulating system or the heater.

Other and further important objects of the invention will be apparent from the disclosures in the drawings and specification.

The invention (in a preferred form) is illustrated in the drawings and hereinafter more fully described.

In the drawings:

Figure 1 is a front plan view of a garbage burner and hot water heater having a grate therein embodying the principles of my invention.

Fig. 2 is a vertical section taken on line 2—2, of Fig. 1, with parts broken away.

Fig. 3 is a horizontal section taken on line 3—3, of Fig. 1, with parts shown in elevation.

Fig. 4 is a section taken on line 4—4, of Fig. 3.

Fig. 5 is an enlarged fragmentary detail section taken on line 5—5 of Fig. 3, showing an expanded grate pipe joint.

As shown on the drawings:

The reference numeral 1, represents a base or foundation upon which is mounted a garbage burner and water heater comprising hollow side walls 2, a rear wall 3, and a front wall 4, suitably connected to one another to permit water to circulate therethrough for heating purposes. The front wall 4, has formed therein a transverse horizontal opening dividing the front wall into an upper portion provided with a garbage door 5, and a lower portion having a fire door 6, therein.

Removably mounted within the garbage burner and heater in a horizontal or other suitable position is a grate embodying the principles of this invention having its rear end positioned a short distance from the rear wall 3, to afford an opening adapted to permit garbage to be pushed from the grate into the fire if desired. The ends of the rear end member of the grate rest upon suitable parallel supports or shelves 7, one of which is integrally formed or rigidly secured on the inner face of each of the side walls 2, while the front end of the grate fills the transverse opening in the front wall 4, of the burner and resting on the lower portion of said front wall, as clearly shown in Figs. 1 and 2, thus dividing the interior of the heater into a lower chamber or fire box 8, and an upper chamber or garbage compartment 9, access to which is had through the respective doors 6 and 5, to permit fuel to be fed into the fire box 8, and garbage into the compartment 9.

The grate comprises a rectangularly cross-sectioned rear tube 10, closed at both ends and having a front wall 11, provided with a plurality of transversely alined threaded apertures in each of which is removably threaded one end of a grate pipe, tube or hollow crossbar 12, while the other end of each of said pipes 12, is swaged or expanded into one of a series of apertures in a rear wall 13, of a rectangularly cross-sectioned front tube 14, longer than the rear tube 10, to fill the transverse opening in the front wall, and also closed at both ends and having a transverse partition 15, centrally formed therein dividing the front tube into an inlet chamber 16, and an outlet chamber 17. The front tube 14, has a front wall 18, provided with a plurality of alined inwardly threaded apertures arranged to line up with the respective apertures in the tube walls 11 and 13, as shown in Fig. 3. Removably threaded into each one of the apertures in said front tube wall 18, is an externally threaded cap or plug 19, adapted to be removed to permit cleaning of the interior passages of the grate members, without necessitating the removal of the grate from the burner or dismembering the same.

As shown in Fig. 3, half of the pipes 12, are arranged to connect the inlet chamber 16, of the front tube 14, with the interior of the rear tube 10, while the other half of the pipes 12, serve to connect the interior of the rear tube 10, with the outlet chamber 17. To permit water to circulate through the grate, an inlet pipe 20, provided with a suitable controlling valve 21, has one end thereof connected in the front wall 18, of the grate to communicate with the inlet chamber 16, and its other end coupled with the hot water system of the garbage burner casing. An outlet pipe 22, provided with a controlling valve 23, has one end thereof connected in the front wall 18, to communicate with the outlet chamber 17, to afford an outlet therefor, while the other end of said outlet pipe 22, is connected with the other side of the hot water system of the heater casing to permit a return of the water.

The operation is as follows:

As described the grate is removably placed or mounted in the garbage burner casing spaced from the rear wall 3, in a horizontal or other suitable position with the ends of the rear tube 10, seated upon the side supports 7, and with the front tube 14, filling up the opening in the front wall 4, of the burner casing, and supported by the lower portion of said front wall, with the plugs 19, conveniently positioned to permit removal of the same, and with the inlet pipe 20, and the outlet pipe 22, communicating with the inlet chamber 16, and the outlet chamber 17, respectively, thus connecting the grate in series with the hot water system of the burner casing. By regulating the controlling valves 21 and 23, the water is permitted to circulate through the inlet pipe 20, into the inlet chamber 16, through the grate pipes 12, connected with said inlet chamber, into the rear tube 10, through the grate pipes 12, connected with the outlet chamber 17, through said chamber and out through the return line pipe 22, into the heater proper. Any sediment or foreign materials settling in the passages of the grate, may be removed through the apertures in the front wall 18, of the front tube 14, by first closing the controlling valves 21 and 23, and then removing the plugs 19, and inserting a suitable scraping or cleaning tool into the various passages of the grate requiring cleaning, without necessitating the removal of the grate from the burner or dismembering the same.

When the heater is operated to burn up garbage which has been deposited upon the grate in the garbage chamber through the garbage door 5, the flames from the fire box pass upwardly between the spaces afforded between the grate pipes 12, and ignite and consume the garbage, any portions of the garbage remaining on the grate may be pushed over the rear end of the grate through the opening afforded between the rear end of the garbage grate and the rear wall 3, into the fire box 8, to be burned with the fuel. With the controlling valves 21 and 23 open the water from the heating system circulates through the grate simultaneously with the circulation of the water through the walls of the heater. In case it becomes necessary to repair or clean the grate the same may be removed from the heater by first closing the valves 21 and 23, and disconnecting the portion of the pipes 20 and 22, connected to the grate. A dummy plate may be mounted in the grate opening in the front wall 4, thus permitting the hot water heater to operate without interruption.

It will readily be seen from the description of the grate construction that each of the parts thereof may be readily removed for cleaning or replacement in case the same becomes damaged, and that the end tubes 10, and 14, and the connecting grate pipes 12, may be of any suitable form other than that described.

I am also aware that various other details of construction may be varied through a wide range without departing from the principles of this invention, and I therefore do not purpose limiting the patent granted otherwise than necessitated by the prior art.

I claim as my invention:

The combination with a garbage burner and hot water heater, of a grate removably mounted therein comprising a rear tube disposed transversely across the burner and spaced from the rear wall of the burner to afford an opening, a chambered front tube, pipes connecting said tubes to form the grate, means connected with said front tube for permitting water to circulate through said grate, removable means in said front tube to permit cleaning of said pipes without removing the grate from its mounting or dismembering the same, said grate adapted to permit unburned garbage remaining thereon to be pushed over the rear end thereof through the opening between the rear tube and the rear wall of the burner into the burner fire box to be burned with the fuel.

In testimony whereof I have hereunto subscribed my name in the presence of two subscribing witnesses.

JAMES A. ROSS.

Witnesses:
 CHARLES W. HILLS, Jr.,
 EARL M. HARDINE.

Copies of this patent may be obtained for five cents each, by addressing the "Commissioner of Patents, Washington, D. C."